Nov. 11, 1947. G. E. DATH 2,430,494
RESILIENT CAR-END BUFFER
Filed Sept. 8, 1944
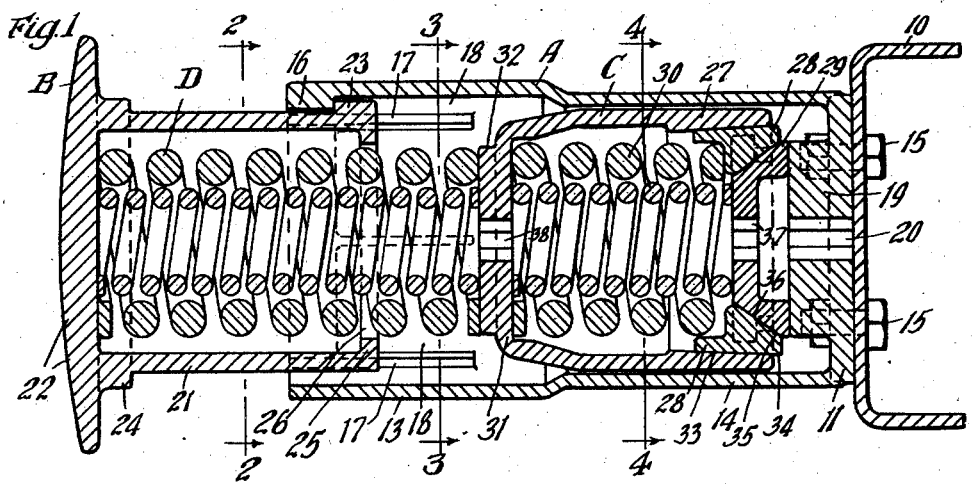
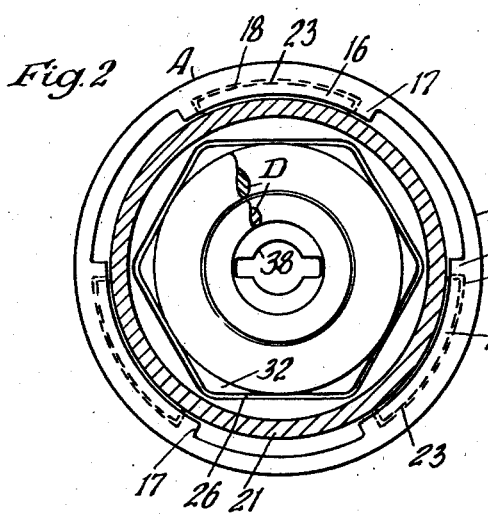
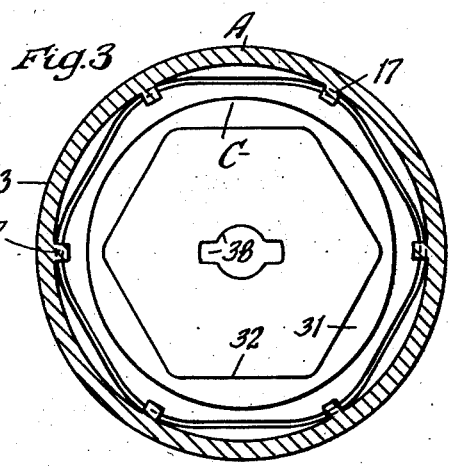
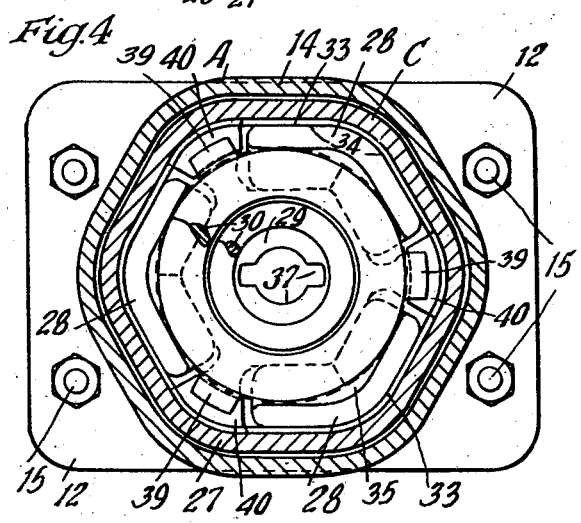
Inventor
George E. Dath
By Henry Fuchs.
Atty.

Patented Nov. 11, 1947

2,430,494

UNITED STATES PATENT OFFICE 2,430,494

RESILIENT CAR-END BUFFER

George E. Dath, Mokena, Ill., assignor to W. H. Miner, Inc., Chicago, Ill., a corporation of Delaware Application September 8, 1944, Serial No. 553,183

5 Claims. (Cl. 213—221)

This invention relates to improvements in buffers for railway cars.

One object of the invention is to provide a simple and efficient buffer mechanism for railway cars having preliminary spring action to absorb the lighter shocks to which the mechanism is subjected, and frictional resistance to take care of the heavier shocks.

A further object of the invention is to provide a buffer mechanism including a preliminary spring resistance and a friction shock absorber actuated successively in absorbing shocks, wherein the preliminary spring resistance is contained in a buffing head and is buttressed against the friction shock absorber which is contained within a housing within which the buffing head is slidingly telescoped.

A more specific object of the invention is to provide a buffer mechanism as set forth in the preceding paragraph wherein the buffer head is anchored to the housing by interengaged shoulders on the housing and head which prevent relative lengthwise separation of the parts, and the head is locked against rotation with respect to the housing by the lugs of the former being guided in longitudinal guideways formed interiorly of said housing, and by interengaging means on the buffer head and friction shock absorber which is effective when the lugs of the head pass out of the guideways of the housing, the interengaging means comprising an angular locking projection or boss on the friction shock absorber engaging within a correspondingly shaped opening in the buffer head, the shock absorber also interfitting with the housing to lock the same against relative rotation.

Other objects of the invention will more clearly appear from the description and claims hereinafter following.

In the drawing forming a part of this specification, Figure 1 is a longitudinal, vertical sectional view of my improved buffer mechanism, illustrating the same mounted in position on the end of a railway car. Figures 2, 3, and 4 are transverse, vertical sectional views, corresponding respectively to the lines 2—2, 3—3, and 4—4 of Figure 1.

In said drawing, 10 indicates a portion of the end wall of a railway car, the portion illustrated being at one side of the longitudinal center line of the car and having my improved buffing mechanism mounted thereon. As will be understood, the buffer mechanism is duplicated at the other side of the car and the two mechanisms cooperate in a well-known manner with a pair of similar buffer mechanisms on the end of an adjacent car.

My improved buffer mechanism proper, as shown in the drawing, comprises broadly a housing A secured to the end of the car; a buffer head B; a friction shock absorber C; and a spring resistance D.

The housing A is in the form of a tubular shell or casing closed at the rear end by a transverse wall 11. The wall 11 is extended laterally beyond the sides of the tubular housing A, thereby providing a pair of flanges 12—12 for securing the housing to the end of the railway car. The tubular housing A comprises a cylindrical front end portion 13, and a portion rearwardly thereof, which is reduced in diameter and is of hexagonal interior and exterior cross section, said rear portion of the housing being indicated by 14. To secure the housing to the end wall 10 of the car, bolts 15—15 are preferably provided, which extend through the flanges 12—12 and said end wall 10. At the open front end thereof, the housing A is provided with three inturned flanges 16, which are equally spaced therearound circumferentially. On the inner side thereof, the wall of the housing A has longitudinally extending, circumferentially spaced ribs 17—17 which are arranged in pairs, the members of each pair extending rearwardly from opposite ends of the corresponding flange 16. Thus, three guideways 18—18—18, closed at the front ends, are provided. The rear wall 11 of the housing A is provided with an inwardly projecting, central boss 19. The wall 11 and the boss 19 are provided with an opening 20 extending therethrough for a purpose hereinafter described. The opening 20 comprises a central, circular portion and diametrically opposed elongations of slot formation, as clearly illustrated in Figure 4.

The buffer head B includes a cylindrical shell portion 21 which extends rearwardly from the buffer head proper 22 which closes the front end of the shell forming the end wall of the same. The wall 22 projects laterally outwardly of the cylindrical shell 21 and, as hereinbefore stated, forms the head member proper of the buffer head. The shell portion 21 of the head B is telescoped within the open end of the housing A and has three equally spaced, outturned flanges 23—23—23 at its inner end respectively engaged in the three guideways 18—18—18 of the housing. As will be evident, the flanges 23—23—23 are adapted to shoulder against the flanges 16—16—16 of the housing A to limit outward movement of the buffer head B. At the front end portion, the shell 21, where it joins the head member proper of the buffer head, is outwardly thickened to provide an annular stop shoulder 24. The stop shoulder 24 is adapted to engage the front end of the housing A to limit inward movement of the buffer head. The shell 21 also has an inturned flange 25 at the rear end thereof which provides an opening 26 of hexagonal, transverse section, which serves a purpose hereinafter pointed out.

The friction shock absorber C includes a friction casing 27, three friction shoes 28—28—28, a wedge pressure transmitting block 29, and a spring resistance 30.

The friction casing 27 is in the form of a tubular member of hexagonal transverse cross section, closed at the front end by a transverse wall 31. The hexagonal casing 27 fits snugly within the hexagonal housing A, thereby preventing relative rotation of these members. At the front end, the casing 27 is provided with a central, hexagonal projection or boss 32, extending from the wall 31. The boss 32 is of a size to snugly fit within the opening 26 of the shell 21 and locks the shell against rotation with respect to the housing A. On the inner side, at the open end thereof, the casing 27 is provided with three inwardly converging, V-shaped friction surfaces 33—33—33. The friction shoes 28, which are disposed within the open end of the casing, have longitudinally extending, outer, V-shaped friction surfaces 34, which respectively engage with the V-shaped friction surfaces 33—33—33 of the casing. As will be evident, the shoes are thus held against rotation with respect to the casing, being confined to longitudinal movement by the interengaging V-shaped surfaces of the casing and shoes. On the inner side, each shoe 28 has a flat wedge face 35 which cooperates with the wedge 29. The wedge 29 is in the form of a block having a flat rear end face which bears on the boss 19 of the housing A. At the front end thereof, the block 29 is provided with three flat wedge faces 36—36—36, respectively engaging the flat wedge faces of the three shoes. The wedge block 29 and the wall 31 of the casing 27 have aligned openings 37 and 38 therethrough, corresponding in transverse outline to the opening 20 and are in longitudinal alignment with said last named opening. The openings 20, 37, and 38 are adapted to receive a clamping bolt for holding the friction shock absorber compressed during the operation of assembling the mechanism. The wedge block 29 is further provided with three radially projecting lugs or arms 39—39—39 which extend between adjacent friction shoes and are adapted to engage in back of inwardly projecting lugs 40—40—40 at the open end of the casing 27. The lugs 39 of the wedge limit outward movement of the latter with respect to the casing 27 and serve to hold the friction shock absorber assembled and of overall uniform length. The spring resistance 30, which is disposed within the casing 27, comprises inner and outer coils bearing respectively at one set of ends thereof on the inner end of the wedge 29 and the shoes 28—28—28 and at the other set of ends thereof on the wall 31 of the casing 27.

The spring D, which forms the preliminary spring of the mechanism and absorbs the lighter shocks, comprises inner and outer coils bearing at the opposite ends on the buffer head wall 22 and the boss 32 of the casing 27 of the friction shock absorber C. This spring is preferably under initial compression when the mechanism is completely assembled.

In assembling my improved buffer mechanism, the friction shock absorber C is first placed in the housing A with the wedge 29 bearing on the boss 19 of the housing A and the openings 37 and 38 in the wall 31 of the casing and the wedge 29 in alignment with the opening 20 in the end wall of the housing A. The friction shock absorber is then compressed and held in compressed condition by any suitable means, preferably a T-headed clamping bolt, not shown. The head of the bolt is placed in abutment with the end wall 31 of the housing A with the shank thereof extending through the openings 37, 38, and 20 and is secured by the usual nut on the rear end of the bolt which engages the outer side of the end wall 11 of the housing A. The T-head of the bolt employed is of such a size that, when turned to register with the openings 37, 38, and 20, it will pass freely therethrough to permit withdrawal of the bolt through the rear end of the housing A. The bolt is so adjusted in assembling the mechanism that the shock abosrber will be held compressed to such an extent that the boss 32 thereof will clear the inner end of the shell 21 of the buffer head B when the shell is telescoped within the housing to a depth to bring the lugs 23 thereof in position to clear the rear ends of the guide ribs 17—17 of the housing A. While the shock absorber C is held in its compressed condition by the clamping bolt, the spring resistance D is placed within the housing against the boss 32 of the casing 27. The buffer head B is then assembled with the housing A by engaging the shell thereof over the spring D and telescoping the same within the housing A with the flanges 23—23—23 thereof aligned with the openings between the flanges 16—16—16 of the housing. The head B is forced inwardly until the lugs 23 are disposed rearwardly of the inner ends of the ribs 17—17 of the housing. After the head B has been forced into the housing to this predetermined extent, it is given a slight turn about its axis to align the flanges 23—23—23 with the guideways 18—18—18 of the housing and align the hexagonal opening 26 of the head with the hexagonal boss 32 of the casing 27 of the friction shock absorber. Pressure is then removed from the buffer head B, permitting the spring D to expand, thus forcing the head B outwardly and engaging the flanges 23 thereof in the guideways 18. As will be evident, the flanges 16—16—16 of the housing positively limit outward movement of the buffer head B. The clamping bolt is then removed from the friction shock absorber, permitting the same to expand to the normal release position shown in Figure 1, expansion thereof being limited by shouldered engagement of the wedge 29 with the casing 27.

The operation of my improved buffer mechanism is as follows: Upon inward movement of the buffer head B through pressure exerted thereon by any object, such as a buffer head of an adjacent car, the head B is forced inwardly of the housing A compressing the spring D against the friction shock absorber C, thus absorbing the lighter shocks to which the mechanism is subjected. As the head B moves further inwardly of the housing A, the inner end of the shell 21 thereof engages the front end of the casing 27 of the friction shock absorber, thereby compressing the latter, taking care of the heavier shocks. At the same time, the open end of the shell 21 is engaged over the boss 32 which enters the hexagonal opening 26 to lock the head B against rotation with respect to the friction shock absorber and the housing A. As hereinbefore pointed out, the parts are thus locked against rotation before the locking flanges 23 of the shell 21 pass beyond the inner ends of the ribs 17 of the housing A. The buffing head B is thus locked against rotation with respect to the housing A during the entire length of travel of the buffer head B inwardly and outwardly of the housing A, thus assuring constant alignment of the flanges 23 with the stop flanges 16 of the housing A and preventing accidental disengagement of the buffer head from the housing. When the actuating force is removed from the buffer head, all the parts of the mechanism are restored to the normal position shown in Figure 1 by the expansive action of the springs D and 30, outward movement of the head B being limited by the flanges 23 thereof engaging the flanges 16 of the housing and expansion of the friction shock absorber C being limited by engagement of the arms 39 of the wedge 29 with the lugs 40 of the friction casing 27.

I have herein shown and described what I now consider the preferred manner of carrying out my invention, but the same is merely illustrative and I contemplate all changes and modifications that come within the scope of the claims appended hereto.

I claim:

1. In a buffer for railway cars, the combination with a housing adapted to be secured to a car, said housing being closed at the rear end; of a friction shock absorber within said housing, said friction shock absorber including a friction casing closed at its front end, a friction clutch slidingly telescoped within the rear end of the casing, and a spring within the casing yieldingly opposing inward movement of the clutch, said friction clutch being buttressed against the closed rear end of the housing; a buffer head slidingly telescoped within the housing, said buffer head having means thereon engageable with said casing to force the same rearwardly during buffeting action; and spring means interposed and reacting between the buffer head and the closed front end of the friction shock absorber.

2. In a buffer for railway cars, the combination with a housing open at one end and closed at the other end; of a buffer head slidingly telescoped within said housing; a friction shock absorber within the housing including a friction casing open at one end and closed at the other end, friction shoes slidable in the open end of the casing, a pressure transmitting wedge in wedging engagement with the shoes, said wedge bearing on the closed end of the housing, and a spring opposing inward movement of the shoes and wedge; cooperating stop lugs on said housing and head, limiting outward movement of the head; internal guideways in the housing with which said lugs of the head are slidingly engaged to limit the latter to lengthwise movement with respect to the housing; and interengageable locking means on said buffer head and closed end of the friction casing, engageable after a predetermined compression of the mechanism, to lock said head against rotation with respect to the casing of the friction shock absorber.

3. In a buffer for railway cars, the combination with a housing open at one end and closed at the other end; of a friction shock absorber within the housing, said friction shock absorber including a friction casing; a buffer head including a tubular shell portion slidingly telescoped within the housing; a locking lug of angular, transverse section projecting from said friction casing; an opening in said head of angular cross section adapted to be engaged over said lug when the mechanism is compressed to a predetermined extent to lock the head to said friction casing against rotation relative thereto; and spring means yieldingly opposing inward movement of the buffer head with respect to the friction shock absorber, the inner end of said shell of the buffer head engaging the friction shock absorber to actuate the same after a predetermined compression of the mechanism.

4. In a buffer for railway cars, the combination with a housing open at one end and closed at the other end, said housing having circumferentially spaced, inturned stop flanges at said open end and inturned guideways extending rearwardly from said flanges in longitudinal alignment therewith; of a friction shock absorber within the housing including a friction casing closed at one end and having a projecting, angular boss at said closed end; a buffer head including a tubular sleeve slidingly telescoped within the open end of said housing, said sleeve being open at the inner end, said opening being of angular shape to interlock with said angular boss of the casing; laterally projecting stop flanges on said open end of the sleeve slidingly engaged in the guideways of the housing and engageable with the stop flanges of the housing to limit outward movement of the buffer head; and a spring within said sleeve bearing at opposite ends respectively on the boss of the friction casing and the buffer head.

5. In a buffer for railway cars, the combination with a housing open at one end and closed at the other end, said housing having circumferentially spaced, inturned stop flanges at said open end and inturned guideways extending rearwardly from said flanges in longitudinal alignment therewith, said guideways being provided by spaced ribs extending rearwardly from opposite sides of each of said stop flanges of the housing; of a friction shock absorber within the housing including a friction casing closed at one end and having a projecting, angular boss at said closed end; a buffer head including a tubular sleeve slidingly telescoped within the open end of said housing, said sleeve being open at the inner end, said opening being of angular shape to interlock with said angular boss of the casing; laterally projecting stop flanges on said open end of the sleeve slidingly engaged in the guideways of the housing and engageable with the stop flanges of the housing to limit outward movement of the buffer head; and a spring within said sleeve bearing at opposite ends respectively on the boss of the friction casing and the buffer head.

GEORGE E. DATH.

REFERENCES CITED

The following references are of record in the file of this patent:

UNITED STATES PATENTS

| Number | Name | Date |
| --- | --- | --- |
| 2,146,015 | Haseltine | Feb. 7, 1939 |

FOREIGN PATENTS

| Number | Country | Date |
| --- | --- | --- |
| 11,257 | Switzerland | 1900 |